United States Patent [19]

Kitamura et al.

[11] Patent Number: 5,334,447
[45] Date of Patent: Aug. 2, 1994

[54] FOAM SUBSTRATE-ATTACHED ADHESIVE SHEETS

[75] Inventors: Yoshinao Kitamura; Shinkiti Yamashita; Yasuyuki Tokunaga; Masahiko Ando; Takeshi Yamanaka, all of Osaka, Japan

[73] Assignee: Nitto Denko Corporation, Osaka, Japan

[21] Appl. No.: 161,268

[22] Filed: Dec. 3, 1993

[30] Foreign Application Priority Data

Dec. 9, 1992 [JP] Japan .................. 4-352554

[51] Int. Cl.$^5$ .............................................. B32B 7/12
[52] U.S. Cl. ...................... 428/317.3; 428/317.7; 428/343
[58] Field of Search ............ 428/317.3, 317.7, 343

[56] References Cited

U.S. PATENT DOCUMENTS

| | | | |
|---|---|---|---|
| 4,898,763 | 2/1990 | Ferro | 428/317.3 |
| 5,128,187 | 7/1992 | Polski | 428/317.3 |
| 5,264,278 | 11/1993 | Mazurek et al. | 428/317.3 |

*Primary Examiner*—Morton Foelak
*Attorney, Agent, or Firm*—Sughrue, Mion, Zinn, Macpeak & Seas

[57] ABSTRACT

A foam substrate-attached adhesive sheet or tape comprising a substrate having formed thereon a layer of a pressure-sensitive adhesive, wherein the substrate is a foam elastomer having a breaking elongation of at least 800% and an apparent 800% modulus of from 1.0 to 15 kg/cm$^2$ in a tensile test of 23° C., and a breaking elongation of at least 400% and an apparent 400% modulus of from 2.0 to 60 kg/cm$^2$ in a tensile test of −30° C.

8 Claims, No Drawings

FOAM SUBSTRATE-ATTACHED ADHESIVE SHEETS

FIELD OF THE INVENTION

The present invention relates to a foam substrate-attached adhesive sheet or tape comprising a sheet-form or tape-form foam substrate having formed thereon a layer of a pressure-sensitive adhesive.

BACKGROUND OF THE INVENTION

Hitherto, an adhesive sheet or tape prepared by forming a layer of a pressure-sensitive adhesive on a substrate comprising of a foam of a butyl rubber, a chloroprene rubber, a synthetic resin, etc., has been widely used to fix mirrors, hooks, face plates, etc., to the walls or the ceilings of buildings, the surfaces of machines or apparatus, etc., or to fix facing finish members such as side moles, emblems, etc., to the bodies of automobiles.

Recently, a so-called acrylic foam tape which is an integrated type adhesive tape of a foam layer comprising a polyacrylic acid ester and a pressure-sensitive adhesive layer as disclosed in, for example, JP-B-3-40752 (the term "JP-B" as used herein means "an examined published Japanese patent application) and JP-A-62-503096 (the term "JP-A" as used herein means an "unexamined published Japanese patent application") is used for the same purposes as described above.

In these foam substrate-attached adhesive sheets, when an external force or vibration is applied to a member to which the adhesive sheet is adhered and fixed, the force applied is dispersed and relaxed by the foam substrate, whereby the strong adhesive force and the strong fix-retention property can be exhibited.

For the walls of recent buildings, building materials and wall papers (cloths) having an uneven design are more preferably used than smooth ones for the purpose of giving a high-grade feeling, and also the form of the body of an automobile tends to be made by the continuation of curves from a straight line in pursuit of the fashinableness.

However, since the adhesive sheets or tapes using a conventional foam such as a butyl rubber, a chloroprene rubber, a synthetic resin, etc. as the substrate, are insufficient in flexibility and are difficult to be deformed, it sometimes happens that the adhesive sheets or tapes cannot take a sufficient adhered area at press-adhering and even when the initial adhered area can be insured, a partial peeling occurs by the remaining internal stress, whereby the fixed members are liable to fall off.

Further, since the above-described acrylic foam tape is flexible and liable to be deformed, the acrylic foam tape can insure the desired adhered area to an uneven surface or a curved surface and thus has excellent fix-retention property for members under normal state, but since such an acrylic foam tape has general (inherent) physical properties of an acrylic pressure-sensitive adhesive to lose the flexibility under low temperature, there is also a problem that when a strong impact is applied to the adhered portion under low temperature, the fixed member is lable to fall off.

SUMMARY OF THE INVENTION

The present invention has been made under the above-described circumstances in the conventional techniques.

An object of the present invention is to provide a foam substrate-attached adhesive sheet or tape having excellent adhesive property to a rough surface and also having excellent fix-retention property for members at low temperature.

As a result of various investigations to attain the above object, it has been found that by using a specific foam elastomer having the tensile properties of low modulus and a high elongation under normal temperature and low temperature as a substrate for forming a layer of a pressure-sensitive adhesive, foam substrate-attached adhesive sheets having excellent adhesive property to a rough surface and also excellent fix-retention property for members at low temperature can be obtained. The present invention has been accomplished based on this finding.

That is, according to the present invention, there is provided a foam substrate-attached adhesive sheet or tape comprising a substrate having formed thereon a layer of a pressure-sensitive adhesive, wherein the substrate is a foam elastomer having a breaking elongation of at least 800% and an apparent 800% modulus of from 1.0 to 15 kg/cm$^2$ in a tensile test at 23° C., and having a breaking elongation of at least 400% and an apparent 400% modulus of from 2.0 to 60 kg/cm$^2$ in a tensile test at −30° C.

In the specification, the tensile tests for the foam elastomer at 23° C. and −30° C. were conducted by punching the foam elastomer sheet having a thickness of from about 0.5 to 1.5 mm with dumbbell #3 and measuring the punched test piece under the condition of a tensile speed of 500 mm/minute using Tensilon.

DETAILED DESCRIPTION OF THE INVENTION

The present invention is described in detail below.

The foam elastomer used in the present inventuion is obtained by kneading a mixture of an elastomer with a rubber reinforcing agent, a vulcanizing agent, a foaming agent, and an antioxidant as essential components, forming the kneaded mixture into a sheet, and causing the vulcanization and foaming.

Any elastomer can be used if it has a rubbery elasticity at about normal temperature and there is no particular restriction on the kind thereof. Specific examples of the elastomer are a natural rubber, an isoprene rubber, a butadiene rubber, a styrene-butadiene rubber, a butyl rubber, a chloroprene rubber, EPM (ethylene-propylene copolymer), EPDM (ethylene-propylene-diene terpolymer), an ethylene-acrylic acid ester copolymer, chlorosulfonated polyethylene, chlorinated polyethylene, a nitrile rubber, an urethane rubber, a polysulfide rubber, an acrylic rubber, an epichlorohydrin rubber, a silicone rubber, a fluorine rubber, a hydrogenated nitrile rubber, and an ethylene-vinyl acetate copolymer. These elastomers can be used alone or as mixtures thereof.

Since the foam substrate-attached adhesive sheets are used in various environmental conditions, it is preferred for the sheets to be balanced in various durabilities such as an ozone resistance, an ultraviolet resistance, a heat resistance, a cold resistance, an oil resistance, a water resistance, an acid resistance, an alkali resistance, etc. From this point of view, in the elastomers described above, a butyl rubber, a chloroprene rubber, EPM, EPDM, an ethylene-acrylic acid ester copolymer, an urethane rubber, an epichlorohydrin rubber, a silicone rubber, and a hydrogenated nitrile rubber are preferred and an epichlorohydrin rubber is more preferred.

Examples of the epichlorohydrin rubber are an epichlorohydrin homopolymer, an epichlorohydrin-ethylene oxide copolymer, an epichlorohydrin-allyl glycidyl ether copolymer, an epichlorohydrin-ethylene oxide-allyl glycidyl ether terpolymer, etc. From the standpoints of the ozone resistance and the cold resistance, the epichlorohydrin-ethylene oxideallyl glycidyl ether terpolymer is most preferred. A mixed system of the above-described terpolymer and other kind of an epichlorohydrin rubber can also be used in the present invention.

Examples of the rubber reinforcing agent which can be used are inorganic reinforcing agents such as carbon black, white carbon (silica), basic magnesium carbonate, activated calcium carbonate, super-fine ground magnesium silicate, etc., and organic reinforcing agents such as a high styrene resin, a cyclized rubber, a coumarone-indene resin, a phenolformaldehyde resin, a modified melamine resin, a vinyltoluene copolymer, lignin, phenol resin fibers, an alicyclic petroleum resin, etc.

Examples of the vulcanizing agent are sulfur compounds such as sulfur, sulfur chloride, sulfur dichloride, morpholine disulfide, alkylphenol disulfide, etc.; inorganic vulcanizing agents such as selenium, tellurium, magnesium oxide, lithage, zinc white, etc.; oximes such as p-quinone dioxime, p,p'-dibenzoylquinone dioxime, tetrachloro-p-benzoquinone, poly-p-dinitrobenzene, etc.; nitroso compounds; polyamines such as hexamethylenediamine, triethylenetetramine, tetraethylenepentamine, hexamethylenediamine, triethylenetetramine, tetraethylenepentamine, hexamethylenediamine carbamate, N,N'-dicinnamylidene-1,6-hexane diamine, 4,4'-methylenebis(cyclohexylamine) carbamate, 4,4'-methylenebis-(2-chloroaniline), etc.; organic peroxides such as dicumyl peroxide, t-butylcumyl peroxide, 2,5-dimethyl-2,5-di(t-butylperoxy)hexane, 2,5-dimethyl-2,5-di( t-butylperoxy )hexine-3,1,3-bis(t-butylperoxyisopropyl)benzene, 1,1-bis(t-butylperoxy)-3,3,5-trimethylcyclohexane, benzoyl peroxide, tert-butylperoxyisopropyl carbonate, etc.; resin vulcanizing agents such as an alkylphenol-formaldehyde resin, an alkylphenol sulfide resin, a hexamethoxymethylmelamine resin, etc.; polyfunctional (meth)acrylate monomers such as ethylene glycol dimethacrylate, trimethylolpropane trimethacrylate, etc.; triallyl isocyanurate; 2,4,6-trimercapto-s-triazine, etc. Those can be properly selected according to the kind of the elastomer.

For the purpose of shortening the vulcanizing time and lowering the vulcanizing temperature, suitable compound may be selected from guanidine compounds, aidehyde-amine compounds, aidehyde-ammonia compounds, thiazole compounds, sulfenamide compounds, thiourea compounds, thiuram compounds, dethiocarbamate compounds, xanthate compounds, etc., and used as a vulcanization accelerator according to the kind of the vulcanizing agent used. Further, zinc white, magnesium oxide, etc., may be used as a vulcanization acceleration aid together with the vulcanization accelerator.

Examples of the foaming agent are inorganic foaming agents such as sodium bicarbonate, ammonium bicarbonate, ammonium carbonate, etc.; nitroso compounds such as N,N'-dinitropentamethylenetetramine, etc.; azo compounds such as azodicarbonamide, azobisisobutylonitrile, etc.; and sulfonylhydrazide compounds such as benzenesulfonylhydrazide, p,p'-oxybis(benzenesulfonylhydrazide), toluenesulfonylhydrazide, etc. Those can be properly selected according to the kind of the vulcanizing agent used. Further, for the purpose of improving the foaming rate and lowering the foaming temperature, a conventional foaming aid suitable for the foaming agent used may be used together.

The antioxidant which is preferably used is a compound which shows a small blooming and does not cause hindrance to the vulcanization reaction. Examples thereof are phenyl-$\alpha$-naphthylamine, 4,4'-($\alpha$,$\alpha$-dimethylbenzyl)diphenylamine, octylated diphenylamine, N-isopropyl-N'-phenyl-p-phenylenediamine, N-phenyl-N'-(3-methacryloyloxy-2-hydroxypropyl)-p-phenylenediamine, a polymer of 2,2,4-trimethyl-1,2-dihydroquinoline, 2,5-di-t-butylhydroquinone, 2,6-di-t-butyl-4-methylphenol, 2,2'-methylene-bis(4-methyl-6-t-butylphenol), 4,4'-thiobis(6-t-butyl-3-methylphenol), 4,4'-butylidenebis(3-methyl-6-t-butylphenol), and tris(nonylphenyl) phosphite.

The foam elastomer used in the present invention may further be compounded with various additives which are usually used to compound with a rubber molding, such as antiscorching agents, ultraviolet absorbers, peptizing agents, processing aids, plasticizers, rubber softeners, fillers, stabilizers, lubricants, flame retardants, antistatic agents, coloring agents, antifungal agents, etc., in addition to the above-described essential components.

Kneading of the elastomer and the above-described essential components and, if necessary, the above-described additives is conducted by using a means which is usually used to knead a rubber blend, such as a mixing roll, a Bunbary mixer, a press kneader, a single screw extruder, a twin screw extruder, etc. The formation of the sheet is conducted by rolling with calender rolls or by a die extrusion. The vulcanization and foaming after the formation of the sheet can be practiced by passing the sheet through an oven zone or a rotocure.

There is no particular restriction on the thickness of the foam elastomer thus obtained, but the thickness thereof is preferably from 0.5 to 5 mm. If the thickness is less than 0.5 mm, the stress dispersing property becomes poor and the adhesive property to a rough surface is decreased. On the other hand, if the thickness is over 5 mm, the remarkable improvement of the characteristics is not obtained.

The features of the present invention are that the tensile characteristics of the foam elastomer in the tensile tests at 23° C. and −30° C. have the following breaking elongation and 800% modulus or 400% modulus:

[Tesile Test at 23° C.]
Breaking Elongation: At least 800% (preferably at least 1,000% ).
800% Modulus: from 1.0 to 15 kg/cm$^2$ (preferably from 2.0 to 10 kg/cm$^2$).

[Tesile Test at −30° C.]
Breaking Elongation: at least 400% (preferably at least 600% ).
400% Modulus: from 2.0 to 60 kg/cm$^2$ (preferably from 4.0 to 30 kg/cm$^2$).

That is, use of the foam elastomer having such low modulus and high breaking elongation at normal temperature and low temperature as the foam substrate enable the foam-substrate-attached adhesive sheets to have excellent adhesive property to a rough surface and fix-retention property for members at low temperature.

On the other hand, if the breaking elongation in the tensile test at 23° C. is less than 800%, the adaptability of the foam substrate-attached adhesive sheets to a rough surface or a curved surface is poor and the adhesive property thereof is decreased. Furthermore, if the apparent 800% modulus becomes less than 10 kg/cm$^2$, the foam elastomer is too soft to apply a sufficient tension to the elastomer, which gives a problem in the step of producing an adhesive sheet, and if the apparent 800% modulus is over 15 kg/cm$^2$, the foam elastomer is too hard and hence the adhesive property of the foam substrate-attached adhesive sheets to a rough surface become poor.

Further, the breaking elongation in the tensile test at −30° C. is less than 400%, the impact resistance of the foam elastomer at low temperature is poor and the fix-retention property for members is decreased. Furthermore, if the apparent 400% modulus is less than 2 0 kg/cm$^2$, the foam elastomer is too soft even at normal temperature and thus there is a problem in the step of producing the foam substrate-attached adhesive sheets. One the other hand, the apparent 400% modulus is over 60 kg/cm$^2$, the impact resistance of the foam elastomer is poor and the fix-retention property for members is decreased.

To make the tensile properties of the foam elastomer in the above described ranges defined by the present invention, for example, the kinds or amounts of the elastomer, the above-described blend, etc., are controlled or the pore sizes, porosity, etc., after the vulcanization and foaming are controlled. However, there is no particular restriction on those methods.

The foam substrate-attached adhesive sheets of the present invention are prepared by forming a layer of a pressure-sensitive adhesive on one surface or both surfaces of the foam elastomer as the substrate at a desired thickness and forming the coated substrate into a sheet or a tape.

There is no particular restriction on the kind of the pressure-sensitive adhesive used in the present invention and, for example, rubber, acrylic, and silicone pressure-sensitive adhesives can be used. The pressure-sensitive adhesive can be of a solution type or of a non-solvent type such as an emulsion type, a hot melt type, etc.

Further, there is no particular restriction on the thickness of the pressure-sensitive adhesive layer and the thickness can be a thickness which is usually applied to conventional adhesive sheets. When the pressure-sensitive adhesive layer is formed on both surfaces of the substrate, the kind, the thickness, and various properties of the pressure-sensitive adhesive may be the same or different between both the surfaces of the substrate.

The methods of forming the layer of the pressure-sensitive adhesive on the substrate are a method of coating the pressure-sensitive adhesive directly on the substrate, a method of forming the layer of the pressure-sensitive adhesive on a separator at a definite thickness and laminating the layer on the substrate, etc. In these methods, onto the substrate comprising the foam elastomer may be previously applied an anchor coat treatment, a corona discharging treatment, an electron ray irradiation treatment, etc., for improving the anchoring property of the pressure-sensitive adhesive layer.

As described above, since the foam substrate-attached adhesive sheets of the present invention use the foam elastomer having the tensile properties of a low modulus and a high breaking elongation at normal temperature and low temperature as the substrate, the adhesive sheets are easily followed and deformed in response to a material having a rough surface, an uneven surface, or a curved surface and can easily ensure the contact area. That is, the foam substrate-attached adhesive sheets have excellent fix-retention property for members. Further, in the case of using the foam substrate-attached adhesive sheets of the present invention, even when an impact is applied to the adhered portion at low temperature, the impact force can be dispersed and relaxed by the substrate comprising the foam elastomer having a high flexibility, whereby a problem that the adhered members fall off at low temperature as in conventional techniques does not occur.

The the present invention is described in more detail by reference to the following examples and reference examples, wherein all parts, unless otherwise indicated, are by weight.

REFERENCE EXAMPLE 1

The following compounding composition A was prepared using an epichlorohydrin-ethylene oxide-allyl glycidyl ether terpolymer (Epichlomer CG, trade name, made by DAISO CO., LTD.) and after kneading the composition with a mixing roll, the kneaded mixture was rolled at a thickness of 0.6 mm to form a sheet. The sheet was valcanized and foamed by heating to 150° C. for 30 minutes to obtain a foam elastomer A having a thickness of 1.0 mm.

[Compounding Composition A]

|  | Amount (Parts) |
| --- | --- |
| Epichlomer CG | 100 |
| Carbon Black | 30 |
| Calcium Carbonate | 20 |
| Dioctyl Phthalate | 10 |
| Ethylene Thiourea | 1.5 |
| N,N'-Dinitrosopentamethylenetetramine | 4 |
| Urea Foaming Aid | 4 |
| 2,2,4-Trimethyl-1,2-dihydroquinoline Polymer | 3 |
| Stearic Acid | 1 |

REFERENCE EXAMPLE 2

By following the same procedure as in Reference Example 1 except that following compounding composition B was used in place of the compounding composition A, a foam elastomer B having a thickness of 1.0 mm was obtained.

[Compounded Composition B]

|  | Amount (parts) |
| --- | --- |
| Epichlomer CG | 100 |
| Carbon Balck | 15 |
| Calcium Carbonate | 10 |
| Dioctyl Phthalate | 5 |
| Ethylene Thiourea | 1 |
| N,N'-Dinitrosopentamethylenetetramine | 4 |
| Urea Foaming Aid | 4 |
| 2,2,4-Trimethyl-1,2-Dihydroquinoline Polymer | 3 |
| Stearic Acid | 1 |

REFERENCE EXAMPLE 3

The following compounding composition C was prepared using Butyl Rubber 365 (trade name, made by Esso Co.). By kneading and rolling the composition and further vulcanizing and foaming the rolled composition in the same manners as in Reference Example 1, a foam elastomer C having a thickness of 1.0 mm was obtained.

[Compounded Composition C]

| | Amount (parts) |
|---|---|
| Butyl Rubber 365 | 100 |
| Carbon Black | 25 |
| Calcium Carbonate | 20 |
| Paraffinic Oil (P-200, trade name, made by Nippon Oil Company, Ltd.) | 10 |
| Magnesium Oxide | 4 |
| Zinc White | 5 |
| p-Quinone Dioxime | 1 |
| N,N'-Dinitrosopentamethylenetetramine | 4 |
| Urea Foaming Aid | 4 |
| 2,2,4-Trimethyl-1,2-dihydriquinoline Polymer | 3 |
| Stearic Acid | 1 |

REFERENCE EXAMPLE 4

A commercially available polyethylenic (vinyl actate content about 17% by weight) foam sheet having a thickness of 1.0 mm and a 25% compression hardness of 1.0 kg/cm² was used as a foam elastomer D.

REFERENCE EXAMPLE 5

According to the method of Example 1 of JP-B-3-40752, an acrylic foam sheet having a thickness of 1.0 mm was prepared and used as a foam elastomer E.

Each of foam elastomers A to E obtained in Reference Examples 1 to 5 described above was punched by dumbbell #3, a tensile test was applied at 500 mm/minute by Tensilon (trade name), and the breaking elongation, the breaking strength, and apparent 800% or 400% modulus of each foam elastomer were determined as the tensile properties thereof at 23° C. and −30° C.

The results obtained are shown in Table 1 and Table 2 below.

TABLE 1

| | 30° C. | | |
|---|---|---|---|
| | Breaking Elongation (%) | Breaking Strength (kg/cm²) | 800% Modulus (kg/cm²) |
| Reference Example 1 | 920 | 11.6 | 8.5 |
| Reference Example 2 | 1,700 | 15.4 | 5.0 |
| Reference Example 3 | 850 | 15.0 | 14.5 |
| Reference Example 4 | 450 | 37.5 | — |
| Reference Example 5 | 1,000 | 4.0 | 2.5 |

TABLE 2

| | −30° C. | | |
|---|---|---|---|
| | Breaking Elongation (%) | Breaking Strength (kg/cm²) | 400% Modulus (kg/cm²) |
| Reference Example 1 | 800 | 29.2 | 23.1 |
| Reference Example 2 | 1,080 | 26.4 | 10.6 |
| Reference Example 3 | 430 | 58.0 | 57.5 |
| Reference Example 4 | 210 | 68.5 | — |
| Reference Example 5 | 20 | 44.1 | — |

Example 1

The foam elastomer A obtained in Reference Example 1 was used as a substrate and by laminating a sheet having thereon a pressure-sensitive adhesive of 100 μm prepared by the following method on both the surfaces of the substrate, a foam substrate-attached adhesive sheet was obtained.

[Preparation of Sheet Having Pressure-Sensitive Adhesive Layer]

In a flask were placed 92 parts of 2-ethylhexyl acrylate, 8 parts of acrylic acid, 0.2 part of N,N'-azobisisobutyronitrile, and 200 parts of ethyl acetate and after replacing the inside atmosphere of the flask with a nitrogen gas, the mixture was stirred at 50° C. for 20 hours to conduct the polymerization. After adding 1% by weight of a tolylene diisocyanate addition product of trimethylolpropane to the polymer solution thus obtained, the solution was coated on a releasing paper and dried at 130° C. for 5 minutes to obtain a sheet having the pressure-sensitive adhesive layer having a thickness of 100 μm.

Example 2

By following the same procedure as in Example 1 except that the foam elastomer B obtained in Reference Example 2 was Used as the substrate, a foam substrate-attached adhesive tape was obtained.

Example 3

By following the same procedure as in Example 1 except that the foam elastomer C obtained in Reference Example 3 was used as the substrate, a foam substrate-attached adhesive tape was obtained.

Comparative Example 1

By following the same procedure as in Example 1 except that the foam elastomer D obtained in Reference Example 4 was used as the substrate, a foam substrate-attached adhesive tape was obtained.

Comparative Example 2

By following the same procedure as in Example 1 except that the foam elastomer E obtained in Reference Example 5 was used as the substrate, a foam substrate-attached adhesive tape was obtained.

On each of the foam substrate-attached adhesive tapes obtained in Examples 1 to 3 and Comparative Examples 1 and 2 described above, an adhesion force test to a rough surface and an impact resistance test at low temperature were conducted as follows.

The test results obtained are shown in Table 3 below.

[Adhesion Force Test to Rough Surface]

A foam substrate-attached adhesive tape having a width of 25 mm lined with a polyester film at one surface thereof was press-adhered onto the uneven surface of a glass plate (KASUMI, trade name, made by Nippon Sheet Glass Company, Limited) under the atmosphere of 23° C. by one-way pressing of a roller of 5 kg and after 20 minutes since then, the 180° peeling adhesion (peeling speed: 50 mm/minute) was measured by a Tensilon. In this case, with the intermittent deformation of the foam substrate, the adhesion was intermittently changed up and down. For this reason the average value of the 10 points at the maximum value side and the 10 points at the minimum value side was defined as the adhesion to a rough surface.

[Low-Temperature Impact Resistance Test]

To the both adhesive surfaces of a foam substrate-attached adhesive tape having a size of 20 mm×20 mm were adhered a bakelite plate having a thickness of 2 mm and a size of 50 mm×50 mm and a stainless steel plate having a thickness of 1 mm and a size of 30 mm×30 mm at the central portion with a light force under the atmosphere of 23° C., and they were press-adhered by one-way pressing of a roller of 2 kg, and the assembly was allowed to stand for 20 minutes. After allowing to stand the assembly for one hour under the atmosphere of −30° C., the assembly was fallen from a height of 1 meter onto concrete and whether or not the adhesive tape was peeled was observed. In the test, 20 adhered samples (including 20 foam substrate-attached adhesive tapes) were prepared and the low-temperature impact resistance was evaluated by the number of the samples which were not peeled off in the 20 samples.

The results obtained are shown in Table 3 below.

TABLE 3

|  | Adheion to Rough Surface (g/25 mm-width) | Low-Temperature Impact Resistance (The number of samples in 20 samples) |
| --- | --- | --- |
| Example 1 | 1,030 | 16 |
| Example 2 | 1,400 | 18 |
| Example 3 | 930 | 11 |
| Comparative Example 1 | 200 | 7 |
| Comparative Example 2 | 1,500 | 2 |

As is clear from the results shown in Table 3 above, it can be seen that the foam substrate-attached adhesive tapes of the present invention obtained in Examples 1 to 3 have a high adhesion to rough surface, have a good low-temperature impact resistance, and have a very excellent balance of both the properties.

While the invention has been described in detail and with reference to specific embodiments thereof, it will be apparent to one skilled in the art that various changes and modifications can be made therein without departing from the spirit and scope thereof.

What is claimed is:

1. A foam substrate-attached adhesive sheet or tape comprising a substrate having formed thereon a layer of a pressure-sensitive adhesive, wherein the substrate is a foam elastomer having a breaking elongation of at least 800% and an apparent 800% modulus of from 1.0 to 15 kg/cm$^2$ in a tensile test of 23° C., and a breaking elongation of at least 400% and an apparent 400% modulus of from 2.0 to 60 kg/cm$^2$ in a tensile test of −30° C.

2. The foam substrate-attached adhesive sheet or tape of claim 1, wherein the foam elastomer is at least one member selected from the group consisting of a butyl rubber, a chloroprene rubber, an ethylene-propylene copolymer, an ethylene-propylene-diene terpolymer, an ethylene-acrylic acid ester copolymer, an urethane rubber, an epichlorolydrin rubber, a silicone rubber, and a hydrogenated nitrile rubber.

3. The foam substrate-attached adhesive sheet or tape of claim 1, wherein the foam elastomer is an epichlorohydrin rubber.

4. The foam substrate-attached adhesive sheet or tape of claim 3, wherein the epichlorohydrin rubber is at least one member selected from the group consisting of an epichlorohydrin homopolymer, an epichlorohydrin-ethylene oxide copolymer, an epichlorolydrin-allyl glycidyl ether copolymer, and an epichlorohydrin-ethylene oxide-allyl glycidyl ether terpolymer.

5. The foam substrate-attached adhesive sheet or tape of claim 1, wherein the foam elestomer has a breaking elongation of at least 1,000% in a tensile test at 23° C.

6. The foam substrate-attached adhesive sheet or tape of claim 1, wherein the foam elastomer has an apparent 800% modulus of from 2.0 to 10 kg/cm$^2$ in a tensile test at 23° C.

7. The foam substrate-attached adhesive sheet or tape of claim 1, wherein the foam elastomer has a breaking elongation of at least 600% in a tensile test at −30° C.

8. The foam substrate-attached adhesive sheet or tape of claim 1, wherein the foam elastomer has an apparent 400% modulus of from 4.0 to 30 kg/cm$^2$ in a tensile test at −30° C.

* * * * *